(12) United States Patent
Furumiya

(10) Patent No.: US 6,760,072 B1
(45) Date of Patent: Jul. 6, 2004

(54) MULTI-PHASE READOUT OF SIGNAL CHARGE TO VERTICAL CCD

(75) Inventor: Masayuki Furumiya, Tokyo (JP)

(73) Assignee: NEC Electronics Corporation (JP)

(*) Notice: Subject to any disclaimer, the term of this patent is extended or adjusted under 35 U.S.C. 154(b) by 0 days.

(21) Appl. No.: 09/346,163

(22) Filed: Jul. 1, 1999

(30) Foreign Application Priority Data

Jul. 3, 1998 (JP) .......................................... 10-188446

(51) Int. Cl.[7] .......................... H04N 3/14; H04N 5/335
(52) U.S. Cl. ...................... 348/312; 348/317; 257/242
(58) Field of Search ............................... 348/311, 312, 348/317; 257/242

(56) References Cited

U.S. PATENT DOCUMENTS

| | | | | |
|---|---|---|---|---|
| 4,675,887 A | * | 6/1987 | Akiyama et al. | ............ 377/58 |
| 5,229,857 A | * | 7/1993 | Taniji | ............ 348/305 |
| 5,376,967 A | * | 12/1994 | Sakota et al. | ............ 348/311 |
| 5,393,997 A | * | 2/1995 | Fukusho et al. | ............ 257/232 |
| 5,436,662 A | * | 7/1995 | Nagasaki et al. | ............ 348/312 |
| 5,686,742 A | * | 11/1997 | Takeuchi | ............ 257/233 |
| 6,356,305 B1 | * | 3/2002 | Akagawa | ............ 348/311 |

FOREIGN PATENT DOCUMENTS

| | | | |
|---|---|---|---|
| JP | 62-154891 | 7/1987 | ............ H04N/9/07 |
| JP | 8-9266 | 1/1996 | ............ H04N/5/335 |
| JP | 9-275206 | 10/1997 | ............ H01L/29/762 |

* cited by examiner

*Primary Examiner*—Andrew Christensen
*Assistant Examiner*—Eric Wisdahl
(74) *Attorney, Agent, or Firm*—Hayes Soloway P.C.

(57) ABSTRACT

There is provided a method of driving a solid-state image sensor, including the steps of transferring signal charges from photoelectric transfer devices to vertical CCDs constituted of a plurality of pixels, when a pulse is applied to the pixel, the pulse being applied to the pixels in at least two pixel lines so that a trailing edge of a first pulse to be applied in a first pixel line corresponds with a leading edge of a second pulse to be applied in a second pixel line, transferring the signal charges from the vertical CCDs to a horizontal CCD, and outputting the signal charges from horizontal CCD to an external circuit. The method makes it possible to prevent an increase in a substrate voltage at which charges are reversely transferred to photodiodes, which increase is caused by simultaneously applying pulses to all signal readers.

16 Claims, 17 Drawing Sheets

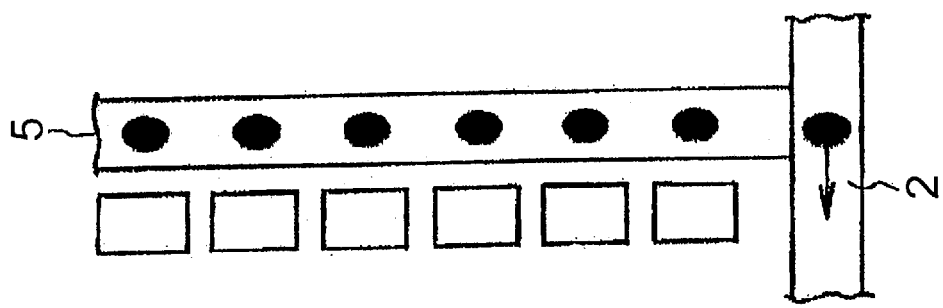
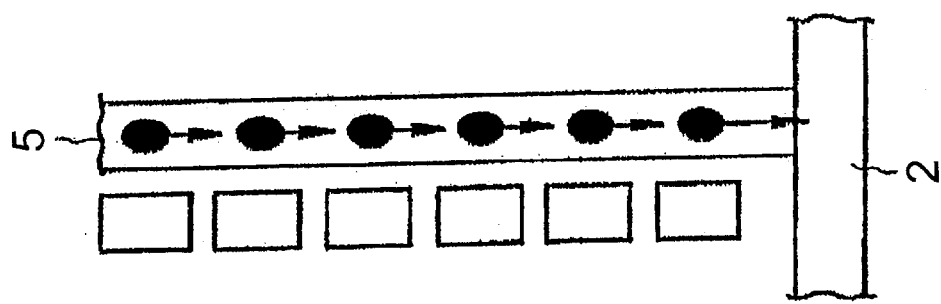
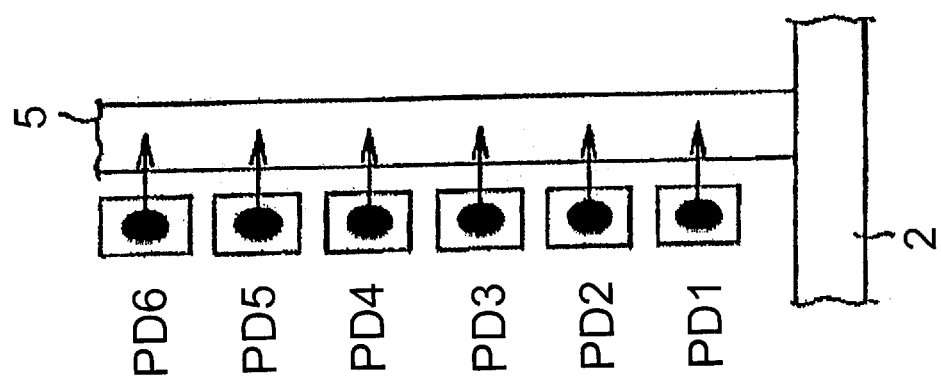
FIG. 6A PRIOR ART
FIG. 6B PRIOR ART
FIG. 6C PRIOR ART

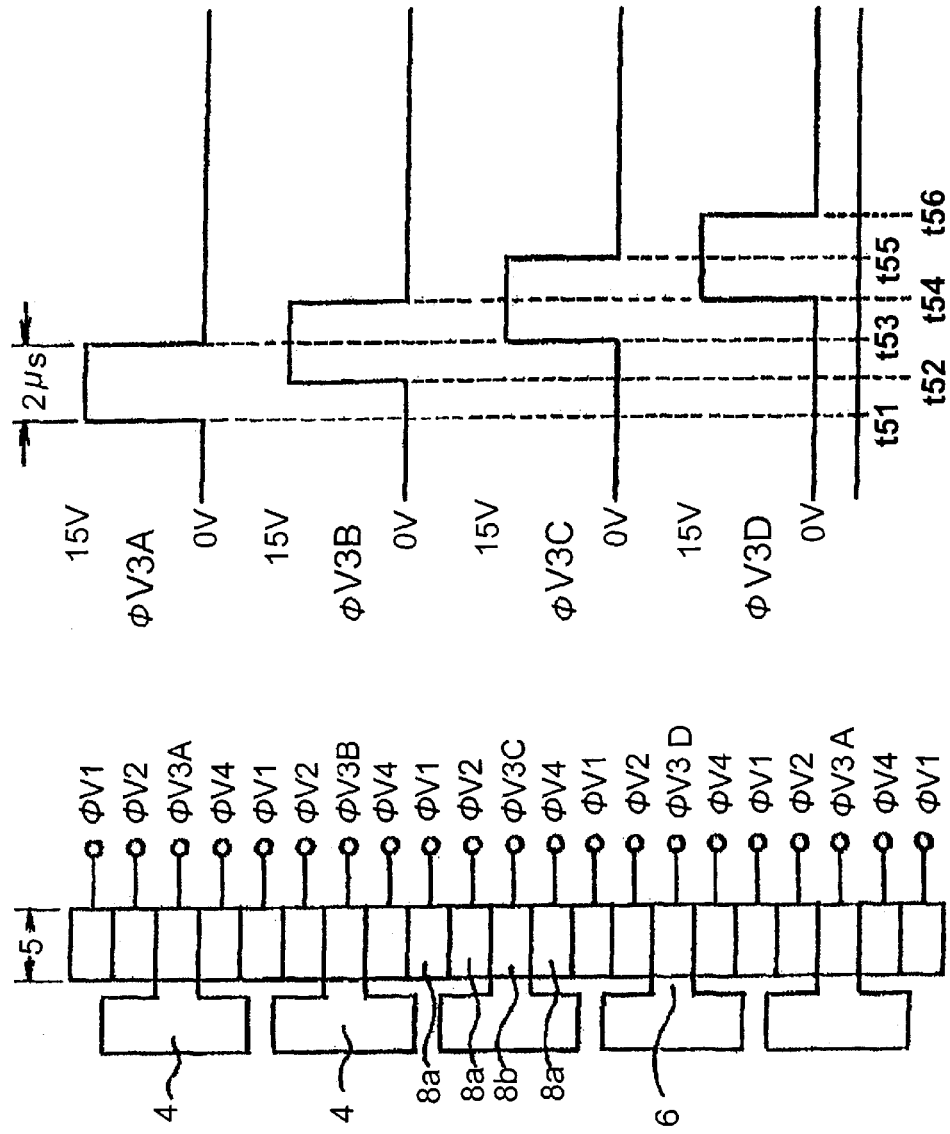

MULTI-PHASE READOUT OF SIGNAL CHARGE TO VERTICAL CCD

BACKGROUND OF THE INVENTION

1. Field of the Invention

The invention relates to a method of driving a solid-state image sensor, and more particularly to a method of reading out signal charges from photoelectric transfer devices to vertical CCDs (charge coupled devices) through signal readers when a pulse is applied to the signal readers,

2. Description of the Related Art

These days, there has been developed a camera to be used for a personal computer in order to input images to the computer. An image sensor incorporated in a conventional camera employing a television system such as NTSC and PAL has been conventionally designed to have an interlace system in which a frame is displayed with two fields. For instance, such an image sensor has been suggested in Japanese Unexamined Patent Publications Nos. 62-154891 and 9-275206.

However, an image sensor with an interlace system is accompanied with a problem of low resolution of images. Hence, an image sensor incorporated in a camera is recently designed to have a non-interlace system in order to enhance resolution of images. In a non-interlace system, signals running through horizontal scanning lines constituting a frame are output in time series. A non-interlace system has an advantage that images can be displayed with ease on a screen such as a personal computer. Hence, an image sensor associated with a non-interlace system, that is, a progressive scan type image sensor has been in demand, and thus, has been researched and developed.

FIG. 1 is a plan view of an interline type charge coupled device (CCD) image sensor associated with a progressive scan system. The illustrated CCD image sensor is comprised of an image sensing region 1, a horizontal CCD 2, an output section or a charge detector 3, a plurality of photodiodes 4 arranged in the image sensing region 1 in a two-dimensional matrix, and a plurality of vertical CCDs 5 each located adjacent to each row of photodiodes.

Each of the photodiodes 4 converts a light into a signal electric charge, and accumulates the thus converted electric charge therein. Each of the vertical CCDs 5 vertically transfers signal electric charges having been transferred from the photodiodes 4. An electric charge reader 6 positioned between each of the photodiodes 4 and each of the vertical CCDs 5 reads a signal electric charge out of each of the photodiodes 4 into each of the vertical CCDs 5. The image sensing region 1 except the photodiodes 4, the vertical CCDs 5, and each of the electric charge readers 6 defines an insulating region for insulating a photodiode from another photodiode. The image-sensing region 1 except the photodiodes, the vertical CCDs 5, and the electric charge readers 6 defines a device isolation region 7.

In operation, a light is converted into an electric charge for a certain period of time in each of the photodiodes 4, and the thus generated electric charge is accumulated in each of the photodiodes 4. The electric charges accumulated in the photodiodes 4 are read out into the vertical CCDs 5 through the electric charge readers 6 by applying a certain voltage to the electric charge readers 6. The electric charges having been read out into the vertical CCDs 5 are transferred towards the horizontal CCD 2 line by line. The electric charges having been transferred to the horizontal CCD 2 are horizontally transferred in the horizontal CCD 2, and then, detected at the output section 3 as an output voltage.

FIG. 2 is an enlarged view of a part of the image sensing region 1 of the image sensor associated with the progressive scan system and capable of reading out signals in every three vertical pixels. A part of the image sensing region 1, illustrated in FIG. 2, is defined by vertical five pixels x horizontal three pixels.

Each of the vertical CCDs 5 includes four vertical transfer electrodes 8a, 8b, 8c, and 8d for each of the photodiodes 4. At least one of the vertical transfer electrodes 8a, 8b, 8c, and 8d doubles as a read-out electrode for reading out a signal electric charge from the photodiode 4 to the vertical CCD 5. For instance, the vertical transfer electrode 8b doubles as such a read-out electrode in FIG. 2.

In the image sensor illustrated in FIG. 2, transfer of electric charges in the vertical CCD 5 is carried out by four-phase drive pulses. Specifically, four-phase pulses φV1 to φV4 are applied to the vertical transfer electrodes 8a to 8d, respectively, in a four-electrode cycle.

Though the four-phase pulses φV1 to φV4 are illustrated as applied only to the vertical transfer electrodes 8a, 8b, 8c and 8d in the rightmost vertical CCD 5 for the purpose of simplification, the same phase pulse is applied to the electrodes located in a common line in the vertical CCDs 5. For instance, the drive pule φV1 is applied to all the vertical transfer electrodes 8 situated uppermost in the three vertical CCDs 5 illustrated in FIG. 2.

In order to make it possible to read out signals at every three pixel lines, drive pulses φV3A, φV3B, and φV3C can be separately applied to the vertical transfer electrode 8b acting as a read-out electrode at every three pixel lines.

FIG. 3 is an enlarged plan view of a couple of pixels illustrated in FIG. 2. As illustrated in FIG. 3, a transfer channel of the vertical CCD 5 vertically extends adjacently to the photodiode 4. As illustrated in FIG. 4, each of the vertical transfer electrodes 8a to 8d to which an electric charge transfer pulse is to be applied is composed of three-layered polysilicon. One of the vertical transfer electrodes 8a to 8d, specifically, the vertical transfer electrode 8b doubles as a read-out electrode for transferring signal electric charges to the vertical CCDs 5 from the photodiodes 4.

FIG. 4 is a cross-sectional view taken along the line IV—IV in FIG. 3, and illustrates a structure of the vertical transfer electrode 8. As illustrated in FIG. 4, the drive pule φV1 is applied to a vertical transfer electrode 8-1 constituted of a first polysilicon layer, the drive pulse φV2 is applied to a vertical transfer electrode 8-2a constituted of a second polysilicon layer deposited over the first polysilicon layer, and the drive pulse φV3 is applied to a vertical transfer electrode 8-2b constituted of the second polysilicon layer. Since the vertical transfer electrodes 8-2a and 8-2b are electrically insulated from each other, it is possible to apply separate pulses to the vertical transfer electrodes 8-2a and 8-2b, although they are constituted of the common polysilicon layer. The drive pule φV3 is applied to a vertical transfer electrode 8-3 constituted of a third polysilicon layer deposited over the second polysilicon layer.

FIG. 5 is a cross-sectional view taken along the line V—V in FIG. 3. As illustrated in FIG. 5, an image sensor is comprised of an n-type substrate 9, a p-type well layer 10 formed in the substrate 9, including an n-type photodiode layer 11 accomplishing photoelectric transfer and accumulating generated signal electric charges, n-type vertical CCD buried layers 12 for vertically transferring electric charges, and an electric charge reader 6 (not illustrated) for reading out electric charges from the photodiode layer 11 into the vertical CCD buried layers 12, p-type vertical CCD well layers 13 located just below the vertical CCD buried layers 12, a heavily doped p-type impurity layer 14 formed above the photodiode layer 11 and between the photodiode layer 11 and the layers 12, 13, an insulating film 15 formed on the p-type well layer 10, vertical CCD transfer electrodes 8 composed of polysilicon and formed within the insulating film 15 above the vertical CCD buried layers 12, and a light-impermeable film 16 formed on the insulating film 15. The light-impermeable film 16 is formed with an opening 17 above the photodiode layer 11.

FIGS. 6A to 6C illustrate how an electric charge is transferred in progressive scanning operation. For simplification, FIGS. 6A to 6C illustrate only one vertical CCD 5, and a part of the horizontal CCD 2 located below the vertical CCD 5. In FIGS. 6A to 6C, a solid circle (●) indicates a packet containing an electric charge therein.

With reference to FIG. 6A, photodiodes PD1 to PD6 are exposed to a light for a certain period of time to thereby convert a light into signal electric charges, and accumulate the thus generated signal electric charges therein. When a read-out voltage is applied to all the read-out electrodes 6, the signal electric charges accumulated in the photodiodes PD1 to PD6 are read out into the vertical CCD 5.

Then, as illustrated in FIG. 6B, the signal electric charges having been read out into the vertical CCD 5 are vertically transferred towards the horizontal CCD 2 line by line.

Then, as illustrated in FIG. 6C, the signal electric charge having been transferred in the vertical CCD 5 reaches the horizontal CCD 2, and is transferred through the horizontal CCD 2 towards the output section 3. Finally, the signal electric charge is output through the output section 3 (not illustrated in FIGS. 6A to 6C).

FIG. 7 illustrates waveforms of the vertical drive pulses $\phi V1$ to $\phi V4$ and how the electric charges are transferred in progressive scanning operation.

The waveforms of the vertical drive pulses are illustrated over one vertical blanking period and subsequent two horizontal blanking periods. The vertical drive pulses are four-phase pulses. When read-out pulses $\phi TGA$, $\phi TGB$, and $\phi TGC$ are applied to the vertical CCDs 5, the signal electric charges are read out of the photodiodes 4 into the vertical CCDs 5.

In FIG. 7, the read-out pulses $\phi TGA$, $\phi TGB$, and $\phi TGC$ are shown as independent pulses, however, it should be noted that the read-out pulses $\phi TGA$, $\phi TGB$, and $\phi TGC$ are applied to the vertical transfer electrode 8b doubling as a read-out electrode in the form that the read-out pulses $\phi TGA$, $\phi TGB$, and $\phi TGC$ are overlapped onto the vertical drive pulses $\phi V3A$, $\phi V3B$, and $\phi V3C$, respectively.

How the electric charges are transferred is shown in a lower half of FIG. 7. The photodiodes 4 and the vertical transfer electrodes 8 are illustrated at the left end. Lower-most rows indicate horizontal transfer electrodes constituting the horizontal CCD 2. A horizontal drive pulse $\phi H1$ is applied to the horizontal transfer electrodes.

In a lower half of FIG. 7, a hollow rectangle indicates a vertical transfer electrode having a packet in which electric charge can be accumulated, but containing no signal electrode charge, and a hatched rectangle indicates a vertical transfer electrode containing a packet in which electric charge is accumulated. Transfer of electric charges with the lapse of time can be understood by virtue of the signal waveforms illustrated in an upper half of FIG. 7, and it is also understood that a signal electric charge is located adjacent to which vertical CCD at a certain timing, by virtue of the photodiodes 4 and the vertical transfer electrodes 8 illustrated at the left. Thus, it is understood how electric charges are transferred.

With reference to FIG. 7, when the vertical drive pulses $\phi V1$ to $\phi V4$ are in a middle level, a channel located below the associated vertical transfer electrode 8 is ready to accumulate electric charges therein. When the vertical drive pulses $\phi V1$ to $\phi V4$ are in a low level, a channel located below the associated vertical transfer electrode 8 is not ready to accumulate electric charges therein.

When the read-out pulses $\phi TGA$, $\phi TGB$, and $\phi TGC$ are in a high level, a signal electric charge is read out from an associated photodiode 4 into the vertical CCD 5. When the read-out pulses $\phi TGA$, $\phi TGB$, and $\phi TGC$ are in a low level, a signal electric charge is not read out.

At time t1, all the read-out pulses $\phi TGA$, $\phi TGB$, and $\phi TGC$ are simultaneously turned into a high level, and signal electric charges accumulated in all the photodiodes 4 are read out into the vertical CCDs 5. The thus read out signal electric charges are accumulated in both a channel located below the vertical transfer electrode 8 associated with the vertical drive pulse $\phi V3$ which is in a high level, and a channel located below the vertical transfer electrode 8 associated with the vertical drive pulse $\phi V4$ which is in a middle level Thereafter, the signal electric charges are downwardly, vertically transferred in each of the vertical CCDs 5 by a pixel in a horizontal blanking period.

FIG. 8A illustrates the photodiodes 4 and the vertical transfer electrodes 8 in an image sensor in which a pulse is applied to vertical transfer electrodes in every three pixel lines, and FIG. 8B illustrates waveforms of a pulse to be applied when electric charges are transferred from the photodiodes 4 to the vertical CCD 5. Specifically, FIG. 8B illustrates waveforms of the pulses $\phi V3A$, $\phi V3B$ and $\phi V3C$ to which the pulses $\phi TGA$, $\phi TGB$ and $\phi TGC$ are overlapped, respectively.

The pulses $\phi V3A$, $\phi V3B$ and $\phi V3C$ are kept at a middle level, for instance, at 0 V, before electric charges accumulated in the photodiodes 4 are read out into the vertical CCDs 5. At time t1, all the pulses $\phi V3A$, $\phi V3B$ and $\phi V3C$ are raised up to a high level, for instance, 15 V. As a result, channels of the electric charge readers 6 are turned on, and accordingly, signal electric charges accumulated in the photodiodes 4 are read out into the vertical CCDs 5.

In order to ensure that all electric charges are read out into the vertical CCDs 5, the pulses $\phi V3A$, $\phi V3B$ and $\phi V3C$ are kept at the high level for about 2 $\mu s$. Then, all the pulses $\phi V3A$, $\phi V3B$ and $\phi V3C$ are fell down to the middle level at time t2. As a result, the channels of the electric charge readers 6 are turned off.

In the above-mentioned progressive scan type image sensor, high positive voltage pulses of about 15 V are concurrently applied to all the electric charge readers 6. As a result, there was caused a problem that a ground potential in the p-type well layer 10 was fluctuated due to the application of the pulse voltages, and hence, a substrate voltage at which electric charges were reversely transferred into the photodiodes 4 was raised (hereinafter, such a substrate voltage is referred to as "reverse-transfer substrate voltage").

This problem is explained in detail hereinbelow.

FIG. 9 illustrates a relation between potential of electrons and a depth in a substrate at the time when a standard substrate voltage is set. As illustrated in FIG. 5, an impurity profile in a depth-wise direction of the substrate included the heavily doped p-type impurity layer 14, the n-type photodiode layer 11, the p-type well layer 10, and the n-type substrate 9. In such a structure, the potential is kept at 0V for electrons existing in the heavily doped p-type impurity layer 14, and the potential makes a valley for electrons existing in the n-type photodiode layer 11. A ground potential of 0V is applied to the p-type well layer 10, and a voltage in the range of about 5V to about 8is applied to the substrate 9.

Since the p-type well layer 10 is doped to a less degree than the heavily doped p-type impurity layer 14, an impurity concentration of the p-type well 10 is influenced by the substrate voltage and other electrodes' voltages.

For instance, as illustrated in FIG. 10, if the substrate voltage is raised up to about 10 to 15 V, a potential in the p-type well layer 10 is varied together with the substrate voltage so that a potential in the p-type well layer 10 becomes deeper, resulting in that a capacity of the photodiode is decreased.

On the other hand, if the substrate voltage is raised up to about 2V, as illustrated in FIG. 11, a difference in potential between a potential for the photodiode and the substrate voltage is reduced, resulting in that electric charges are reversely transferred from the substrate to the photodiodes. In such a condition, the image sensor cannot operate. For this reason, a substrate voltage is usually set equal to a voltage higher than the reverse-transfer voltage by about 1V.

Specifically, since the reverse-transfer voltage is in the range of about 2 to 3V, a minimum substrate voltage can be set at 3 to 4 V.

As mentioned above, the reverse-transfer voltage is relatively low in conventional television system such as NTSC and PAL where read-out pulse are not applied to all the transfer electrodes at a time. This is because a timing at which electric charges are to be read out in a line is different from other timings at which electric charges are to be read out in other lines, in a conventional television system usually operated in accordance with the interlace system.

However, since pulses are simultaneously applied to all the electrodes in such a progressive scan type image sensor as mentioned above, there was caused a problem that a ground potential in the p-type well layer was fluctuated due to the application of the pulse voltage, and hence, the reverse-transfer voltage was raised.

As a result, as illustrated in FIG. 12, since a highly positive voltage, for instance, a voltage of 15V is applied to the read-out electrodes as a pulse for reading out electric charges, a potential for the n-type photodiode layer in the photodiode is fluctuated, and a potential for the photodiodes is fluctuated to be deepened relative to a case where no read-out voltage is applied.

Under such a circumstance, even if a substrate voltage is set equal to 5V as usual, for instance, such a substrate voltage is low in view of a relation between a potential for the photodiode and the substrate voltage, As a result, electric charges are readily reversely transferred from the substrate to the photodiodes, as shown with the curve C2 in FIG. 12. In such a case, the reverse-transfer voltage is raised up to about 5 to 6V.

Hence, the substrate voltage has to be set equal to 6 to 7V, because the substrate voltage is necessary to be set higher than the reverse-transfer voltage by about 1V. This means that an image sensor has to operate with a small amount of electric charges being accumulated in the photodiodes. As a result, it is not possible to accumulate a large amount of electric charges in the photodiodes, and hence, a dynamic range is restricted, and highly qualified image outputs cannot be obtained.

SUMMARY OF THE INVENTION

In view of the above-mentioned problems, it is an object of the present invention to provide a method of driving an image sensor which method is capable of preventing the reverse-transfer voltage from being increased.

There is provided a method of driving a solid-state image sensor, including the steps of (a) transferring signal charges from photoelectric transfer devices to vertical CCDs constituted of a plurality of pixels, when a pulse is applied to the pixel, the pulse being applied to the pixels in every two or more pixel lines so that a pulse to be applied in a first pixel line and a pulse to be applied in a second pixel line are applied at different timings, (b) transferring the signal charges from the vertical CCDs to a horizontal CCD, and (c) outputting the signal charges from the horizontal CCD to an external circuit, There is further provided a method of driving a solid-state image sensor, including the steps of (a) transferring signal charges from photoelectric transfer devices to vertical CCDs constituted of a plurality of pixels, when a pulse is applied to the pixel, the pulse being applied to the pixels in every two or more pixel lines so that a trailing edge of a first pulse to be applied in a first pixel line is in synchronization with a leading edge of a second pulse to be applied in a second pixel line, (b) transferring the signal charges from the vertical CCDs to a horizontal CCD, and (c) outputting the signal charges from horizontal CCD to an external circuit.

It is preferable that at least two trailing edges of pulses are in synchronization with leading edges of other pulses, respectively.

There is still further provided a method of driving a solid-state image sensor, including the steps of (a) transferring signal charges from photoelectric transfer devices to vertical CCDs constituted of a plurality of pixels, when a pulse is applied to the pixel, the pulse being applied to the pixels in every two or more pixel lines so that a trailing edge of a pulse to be applied in a pixel line is in synchronization with a leading edge of a pulse to be applied in an adjacent pixel line, (b) transferring the signal charges from the vertical CCDs to a horizontal CCD, and (c) outputting the signal charges from horizontal CCD to an external circuit.

There is yet further provided a method of driving a solid-state image sensor, including the steps of (a) transferring signal charges from photoelectric transfer devices to vertical CCDs constituted of a plurality of pixels, when a pulse is applied to the pixel, the pulse being applied to the pixels in every two or more pixel lines so that a trailing edge of a pulse applied to the first pixel line is in synchronization with a leading edge of a pulse applied to the last pixel line, (b) transferring the signal charges from the vertical CCDs to a horizontal CCD, and (c) outputting the signal charges from horizontal CCD to an external circuit.

It is preferable that the pulses are applied to pixel lines at the same interval. It is also preferable that the pulses are applied to pixel lines at the same period of time.

There is still yet further provided a method of reading out signal charges from photoelectric transfer devices to vertical CCDs constituted of a plurality of pixels, when a pulse is applied to the pixel, the pulse being applied to the pixels in every two or more pixel lines s0 that pulses are applied to adjacent pixel lines at different timings.

There is further provided a method of reading out signal charges from photoelectric transfer devices to vertical CCDs constituted of a plurality of pixels, when a pulse is applied to the pixel, the pulse being applied to the pixels in every two or more pixel lines so that a trailing edge of a first pulse to be applied in a first pixel line is in synchronization with a leading edge of a second pulse to be applied in a second pixel line.

The advantages obtained by the aforementioned present invention will be described hereinbelow.

In accordance with the present invention, a plurality of pulses for reading electric charges from photodiodes to vertical CCDs are synchronized with each other so that they are cancelled with each other, to thereby ensure eliminate fluctuation in a ground potential of a p-type well layer which fluctuation would be caused due to application of high positive voltages to the vertical CCDs, and further prevent an increase in the reverse-transfer voltage.

The prevention of an increase in the reverse-transfer voltage in turn make it possible to set a lower substrate voltage, and to enhance a saturated amount of electric charges for a photodiode. This results in that a dynamic range can be widened, and highly qualified images can be obtained.

In addition, in accordance with the present invention, a plurality of pulses is cancelled with each other at least once. As a result, it is possible to minimize a gap in time for accumulating electric charges in the photodiodes. Hence, disturbance in images, caused by a difference in time for accumulating electric charges in the photodiodes, can be reduced to such a degree as it is no longer a problem.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIGS. 6A to 6C illustrate electric charges being transferred in progressive scan operation.

FIG. 17A is a plan view of photodiodes and a vertical CCD in an image sensor in which read-out pulses are applicable in every four pixel lines, in accordance with the fourth embodiment.

FIG. 17B illustrates waveforms of read-out pulses applied to pixels illustrated in FIG. 17A.

DESCRIPTION OF THE PREFERRED EMBODIMENTS

[First Embodiment]

Figure 1:
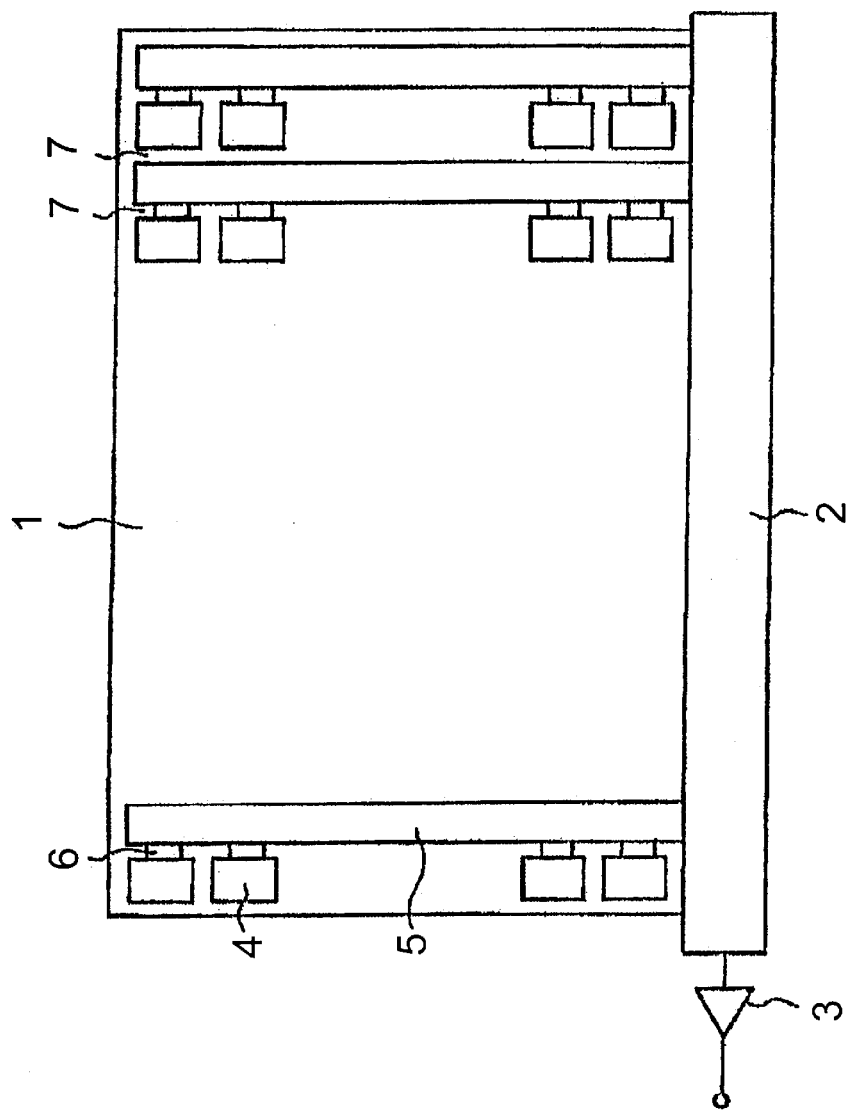
FIG. 1 is a plan view of a progressive scan type interlace CCD image sensor.
Figure 2:
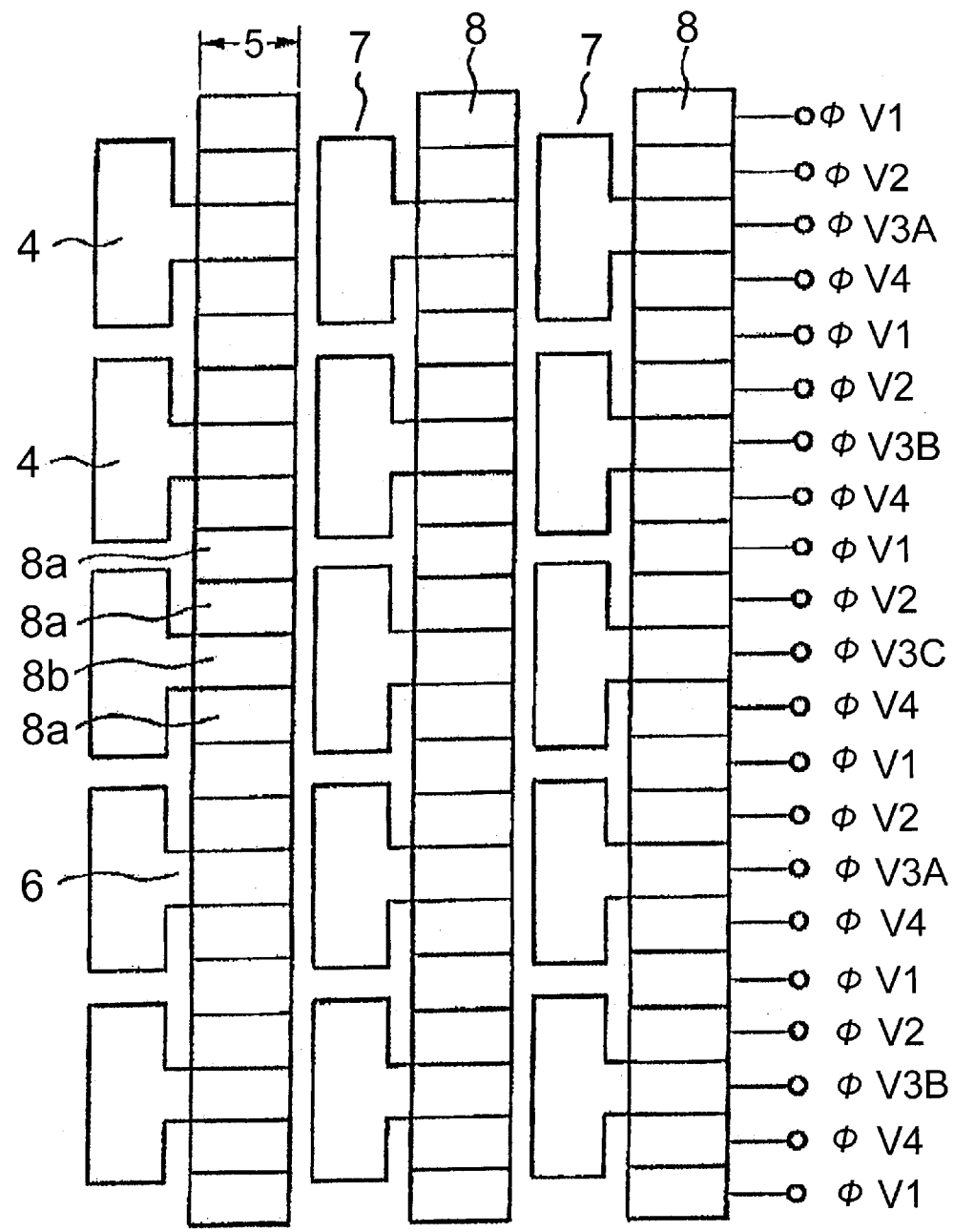
FIG. 2 is a plan view of photodiodes and vertical CCDs in an image sensor in which read-out pulses are applicable in every three pixel lines.
Figure 3:
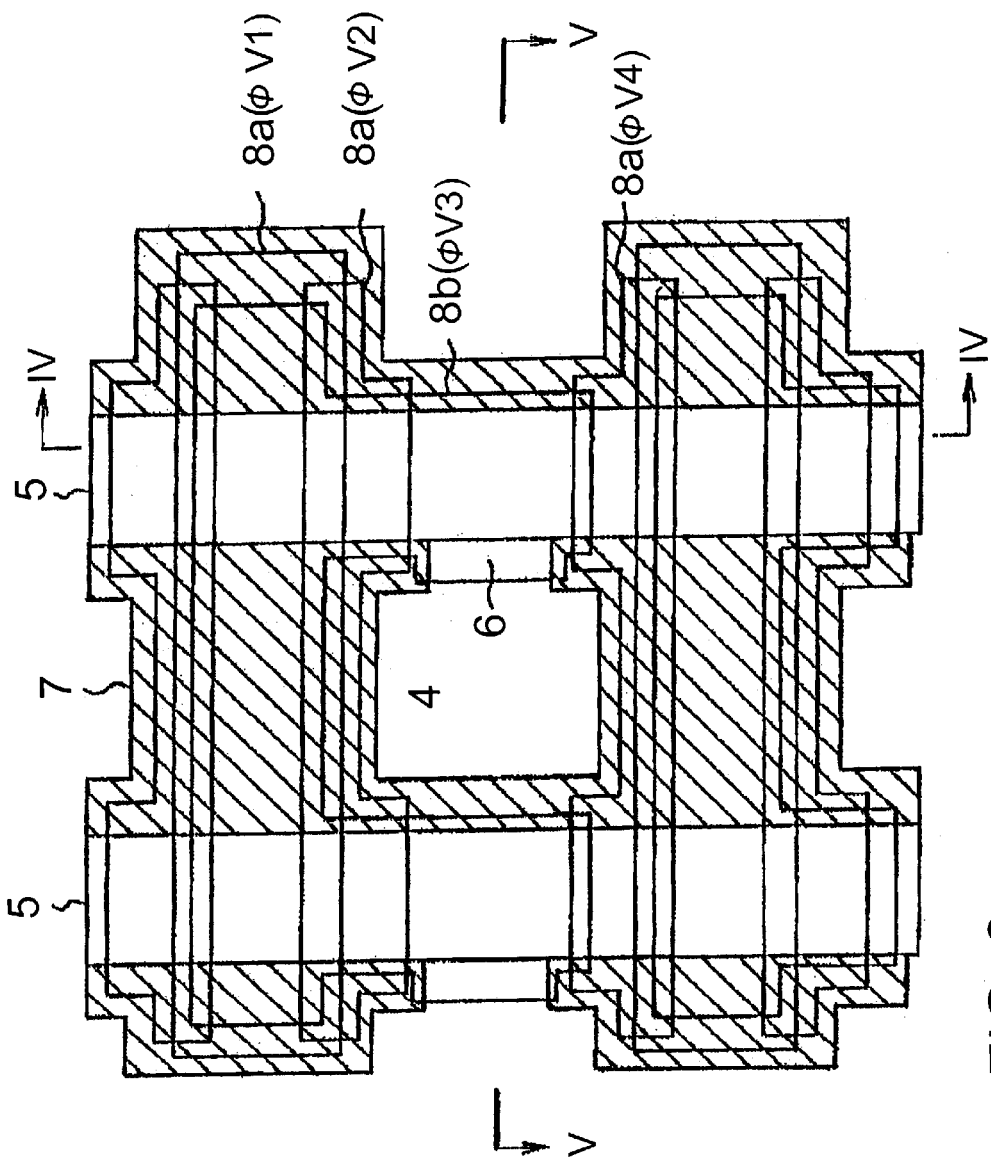
FIG. 3 is an enlarged view of a part of FIG. 2.
Figure 4:
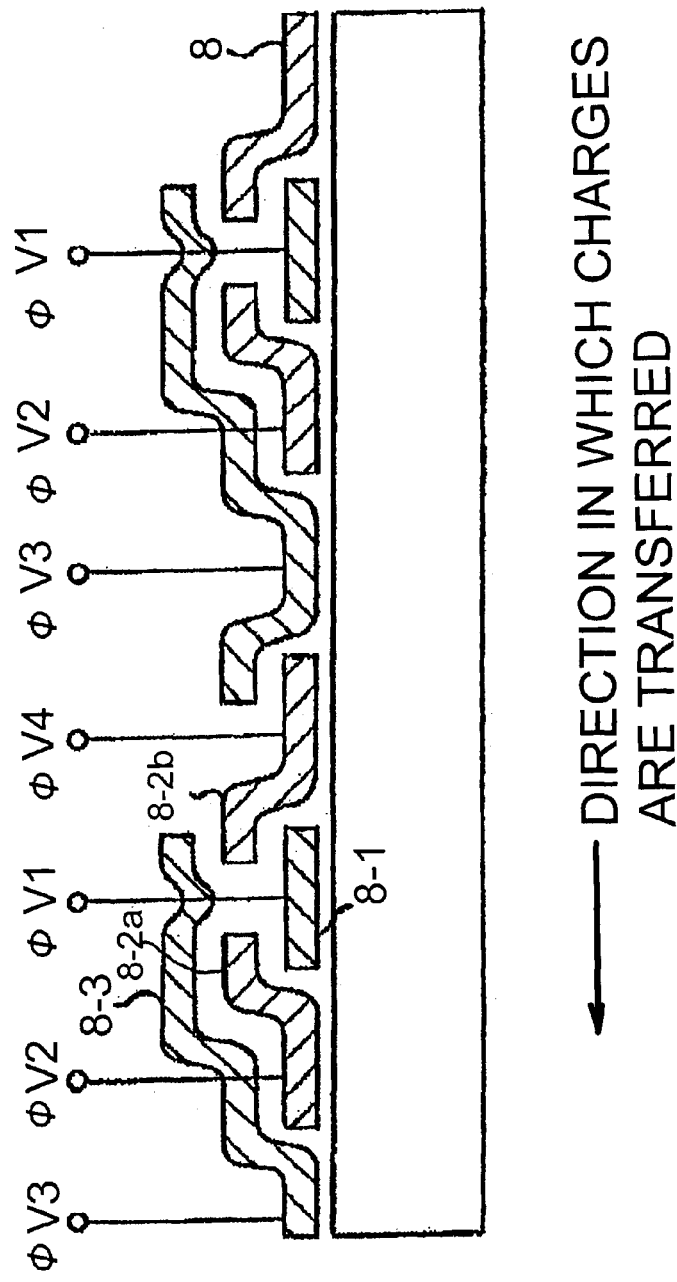
FIG. 4 is a cross-sectional view taken along the line IV—IV in FIG. 3.
Figure 5:
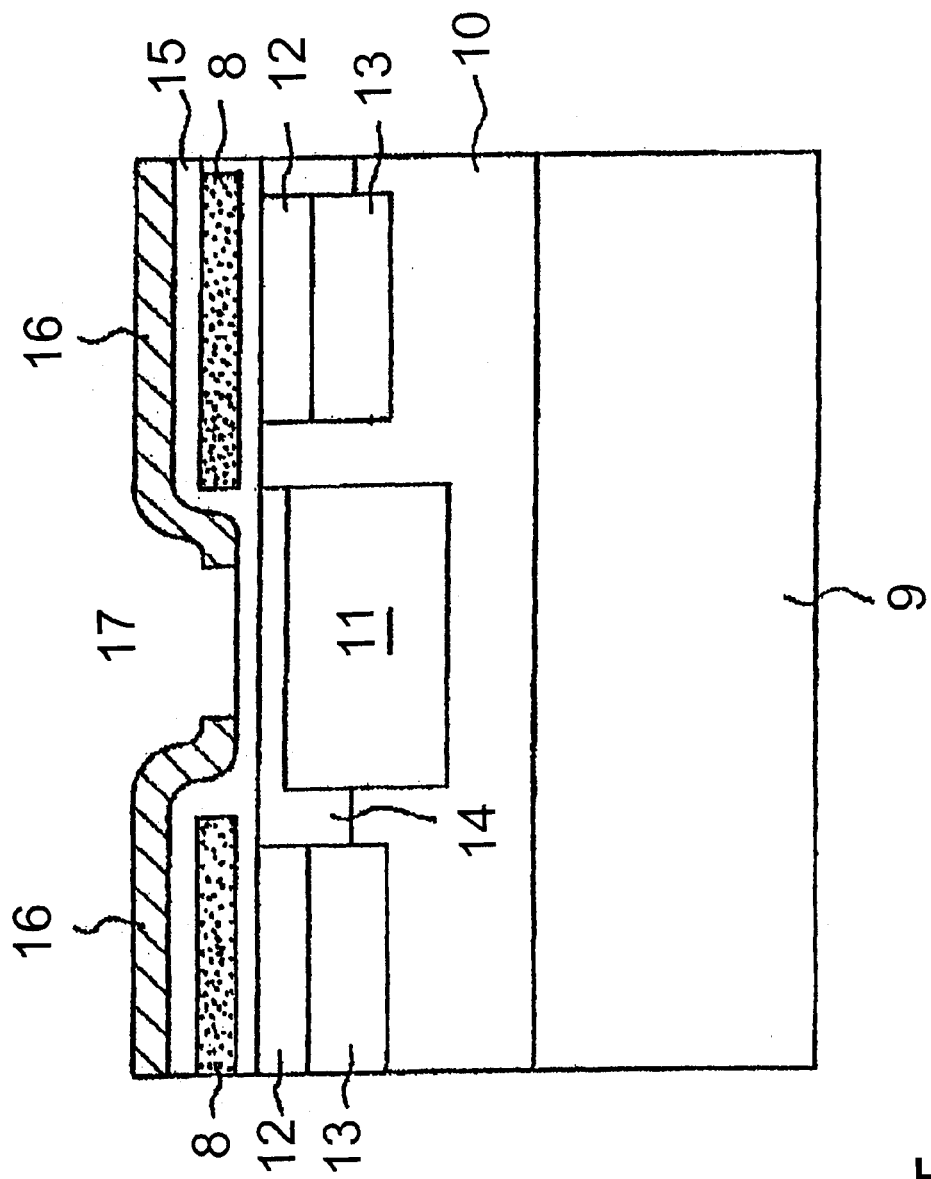
FIG. 5 is a cross-sectional view taken along the line V—V in FIG. 3.
Figure 7:
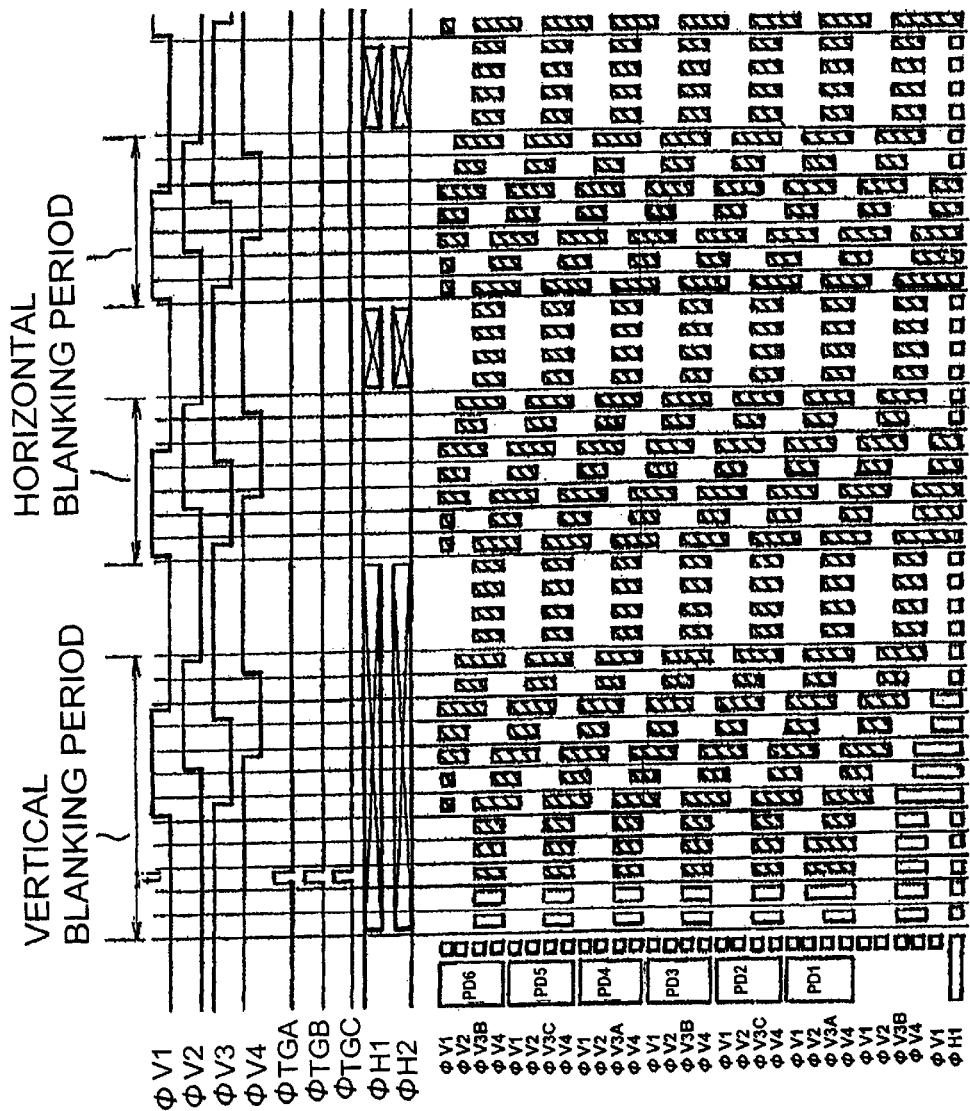
FIG. 7 illustrates waveforms of vertical drive pulses and transfer of electric charges in progressive scan operation.
Figures 8A, 8B:
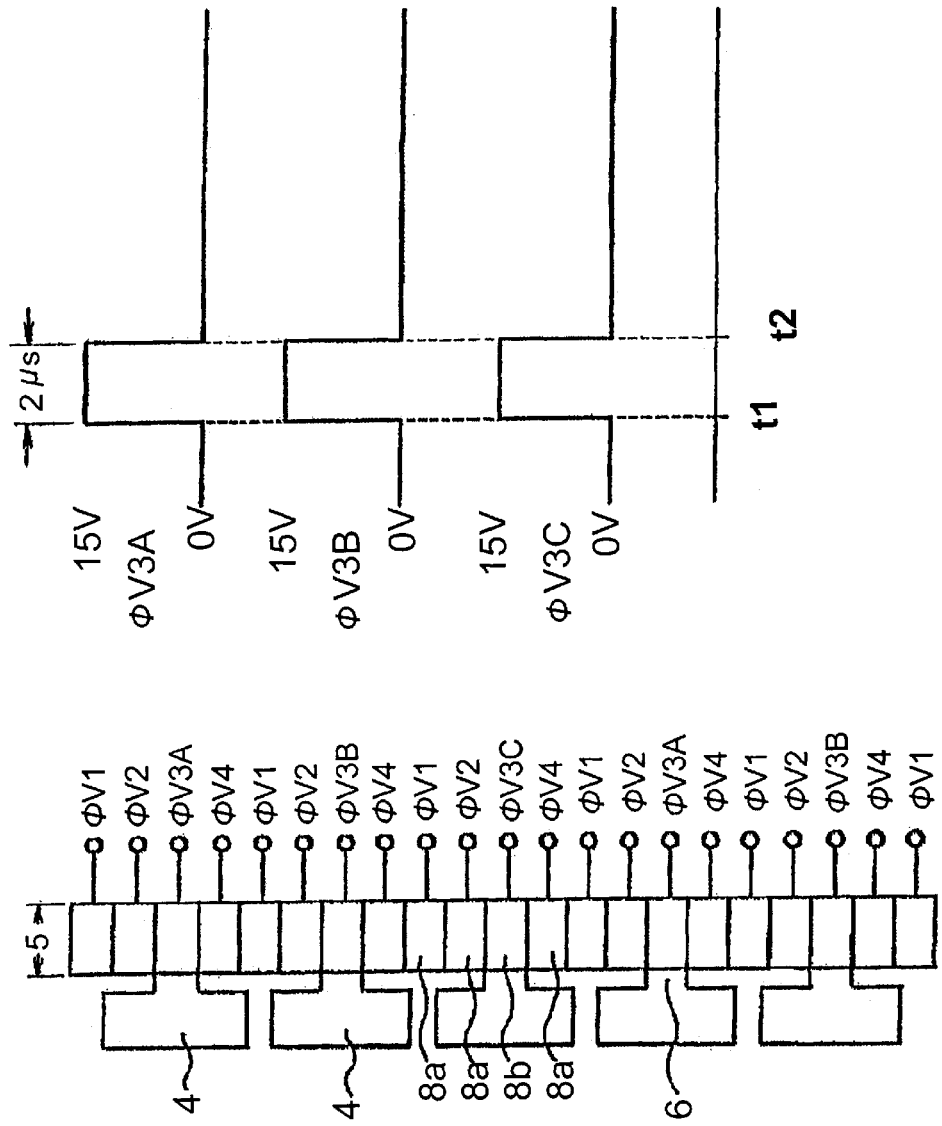
FIG. 8A is a plan view of photodiodes and a vertical CCD in a conventional image sensor in which read-out pulses are applicable in every three pixel lines.
FIG. 8B illustrates waveforms of read-out pulses.
Figure 9:
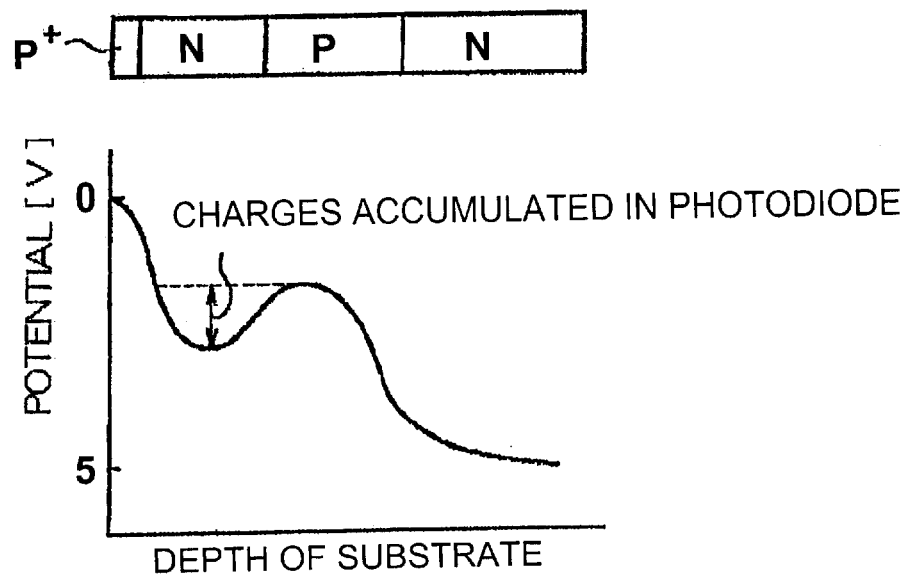
FIG. 9 illustrates a relation between a potential and electrons in a depth-wise direction of a substrate, found when a standard substrate voltage is set.
Figure 10:
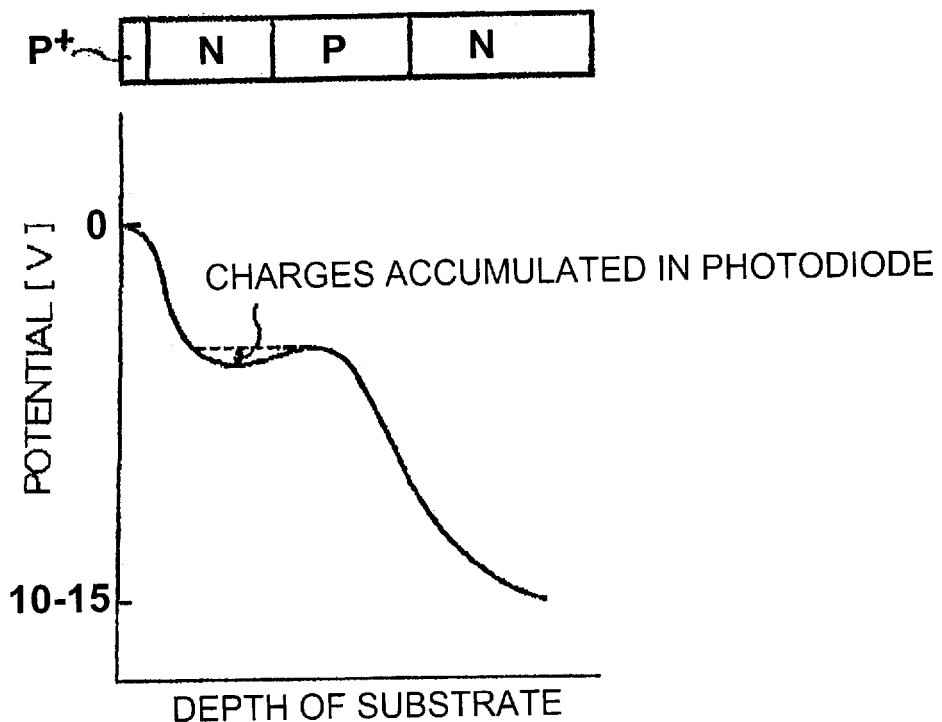
FIG. 10 illustrates a relation between a potential and electrons in a depth-wise direction of a substrate, found when a substrate voltage is raised.
Figure 11:
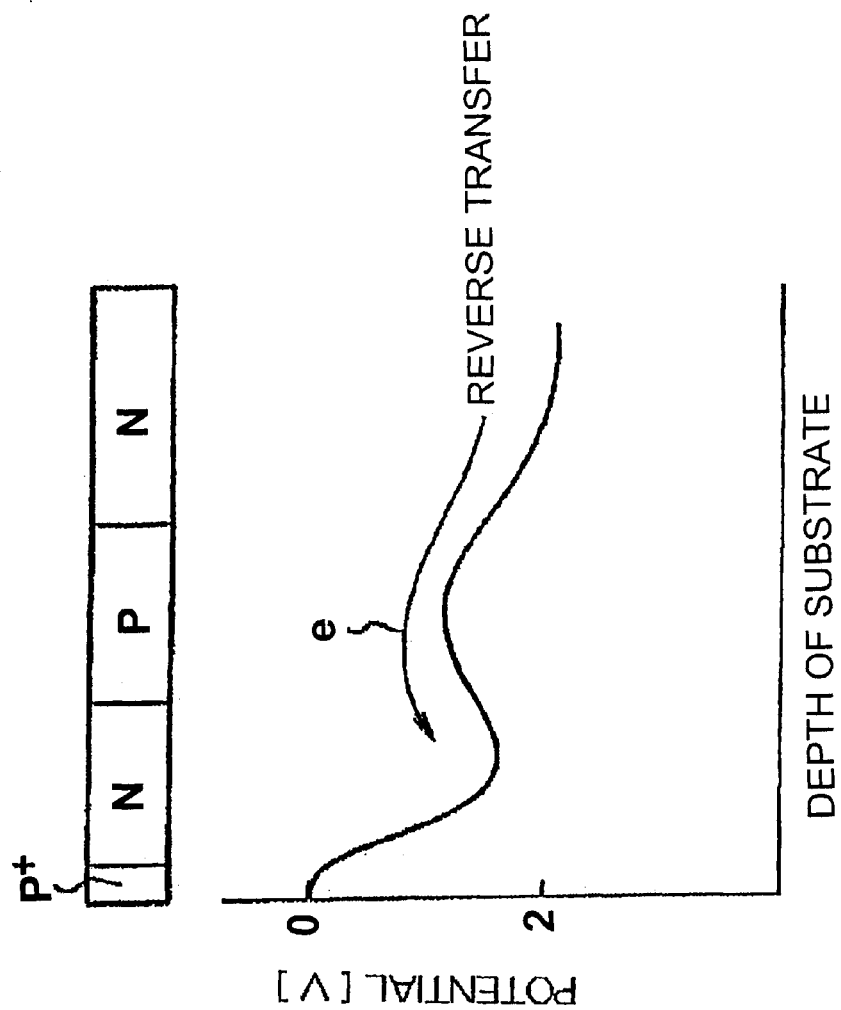
FIG. 11 illustrates a relation between a potential and electrons in a depth-wise direction of a substrate, found when a substrate voltage is too much lowered, and as a result, electric charges are reversely transferred from a substrate to photodiodes.
Figure 12:
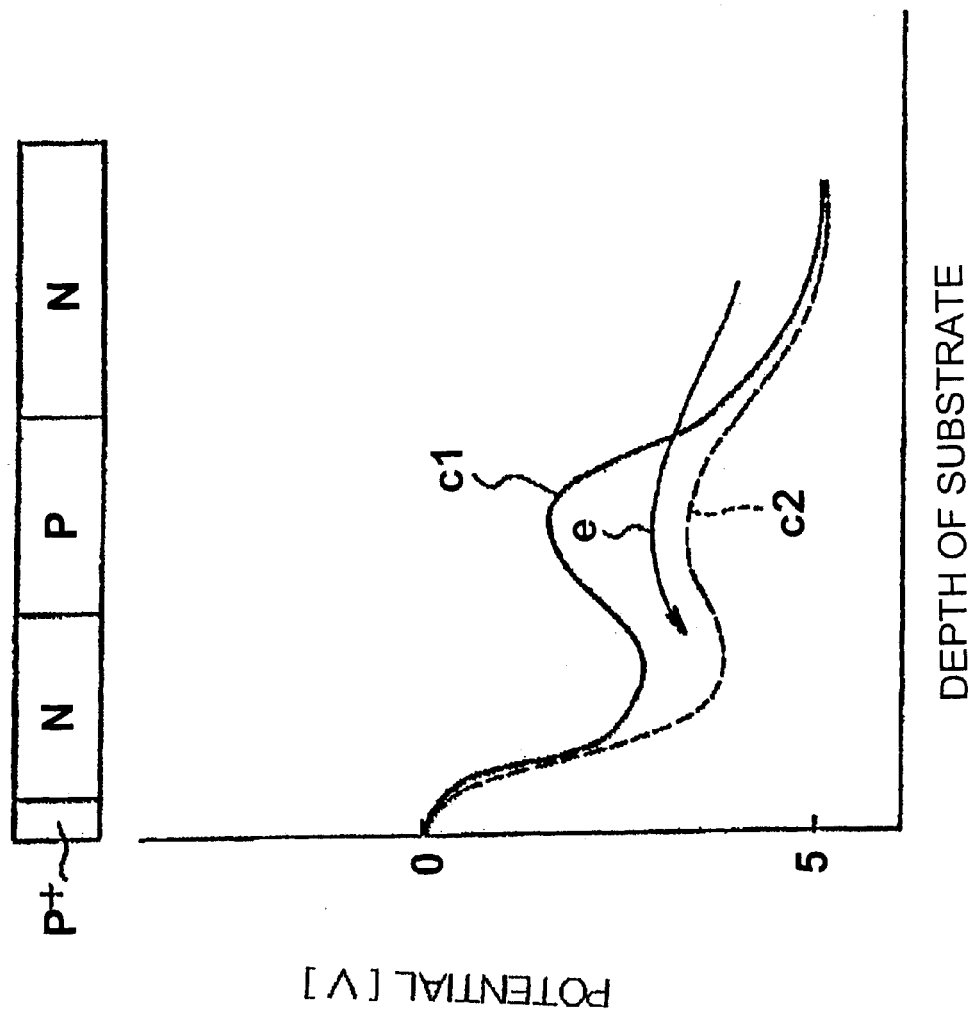
FIG. 12 illustrates a relation between a potential and electrons in a depth-wise direction of a substrate in a progressive scan type image sensor.
Figures 13A, 13B:
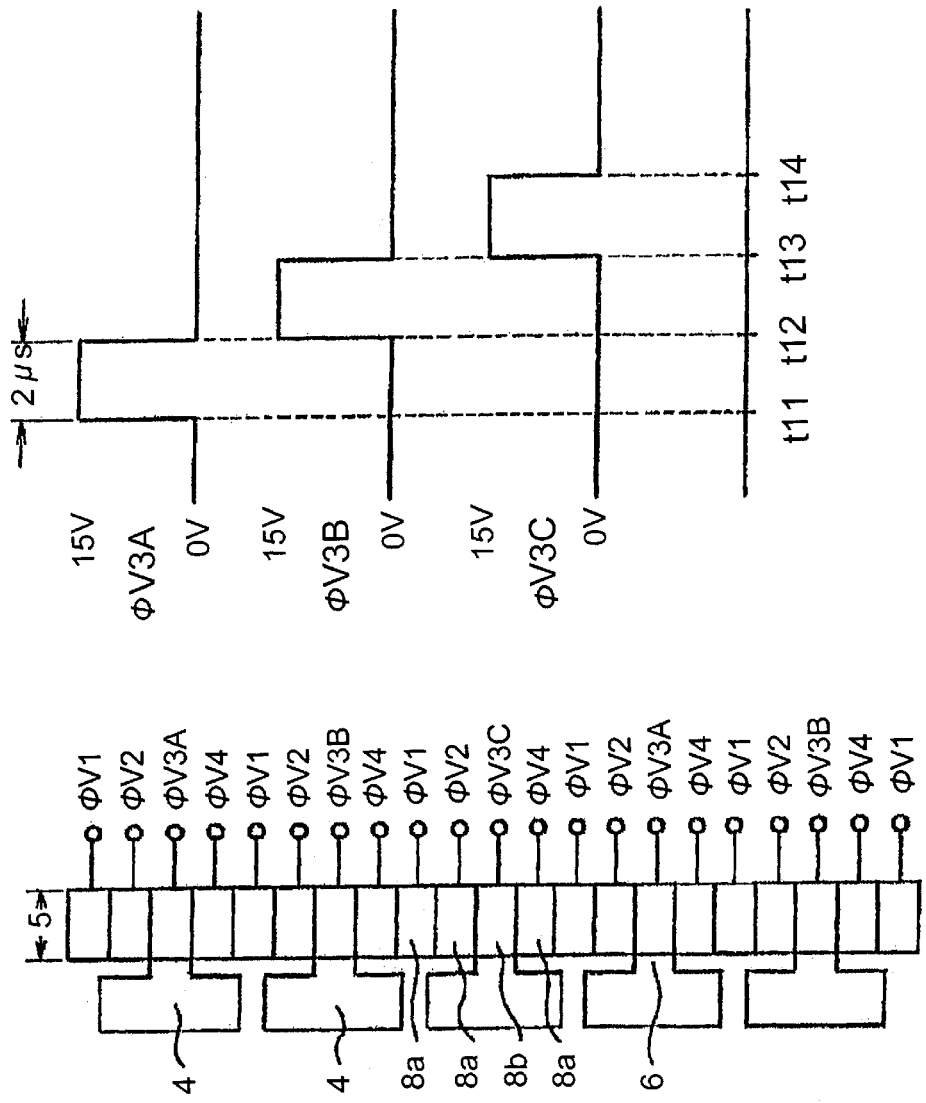
FIG. 13A is a plan view of photodiodes and a vertical CCD in an image sensor in which read-out pulses are applicable in every three pixel lines, in accordance with the first embodiment.
FIG. 13B illustrates waveforms of read-out pulses applied to pixels illustrated in FIG. 13A.

FIG. 13A illustrates photodiodes and a vertical CCD in an image sensor used for carrying out a method in accordance with the first embodiment, and FIG. 13B illustrates waveforms of read-out pulses applied to pixels in the image sensor. In the image sensor, different read-out pulses are applied to pixels in every three pixel lines. As illustrated in FIG. 13A, read-out pulses φV3A, φV3B and φV3C are applied to vertical transfer electrodes 8b acting also as a read-out electrode.

A method of driving an image sensor, in accordance with the first embodiment, is applied to a progressive scan type solid-state image sensor having such a structure as explained with reference to FIGS. 1 to 5.

With reference to FIG. 13B, the pulse φV3A is varied from a middle level (for instance, 0V) to a high level (for instance, 15V) at time t11 in a vertical blanking period. The pulse φV3A has a duration of about 2 μs. Hence, the pulse φV3A is varied from the high level to the middle level at time t12 which is later than time t11 by about 2 μs, because electric charges are all read out from the associated photodiode at time t12.

In synchronization with time 12 at which the pulse φV3A is reduced to the middle level, the pulse φV3B is raised from a middle level to a high level. Both a trailing edge of the pulse φV3A and a leading edge of the pulse φV3B are applied to the image sensing region. Since positive and negative pulse voltages are simultaneously applied to the image-sensing region, influences exerted by those voltages are cancelled with each other. This results in that a ground potential in the p-type well layer is not caused to fluctuate, and an increase in the reverse-transfer voltage can be suppressed.

Then, the pulse φV3B is varied from the high level to the middle level at time t13 which is later than time t12 by about 2 μs, because electric charges are all read out from the associated photodiode at time t13.

In synchronization with time 13 at which the pulse φV3B is reduced to the middle level, the pulse φV3C is raised from a middle level to a high level. Both a trailing edge of the pulse φV3B and a leading edge of the pulse φV3C are applied to the image sensing region. Since positive and negative pulse voltages are simultaneously applied to the image-sensing region, influences exerted by those voltages are cancelled with each other. This results in that a ground potential in the p-type well layer is not caused to fluctuate, and an increase in the reverse-transfer voltage can be suppressed.

Thus, an increase in the reverse-transfer voltage, caused by application of a high positive voltage to pixels, can be suppressed, resulting in that a substrate voltage can be reduced. The reduced substrate voltage enhances accumulation capacity of a photodiode, and hence, enhances a saturated amount of electric charges for a photodiode. This results in that a dynamic range can be widened, and highly qualified images can be obtained.

In the first embodiment, the pulses φV3A, φV3B and φV3C are applied to pixels in this order, but it should be noted that an order in which the pulses φV3A, φV3B and φV3C are applied to pixels is not to be limited to this. The pulses φV3A, φV3B and φV3C may be applied in any order.

[Second Embodiment]

Figures 14A, 14B:
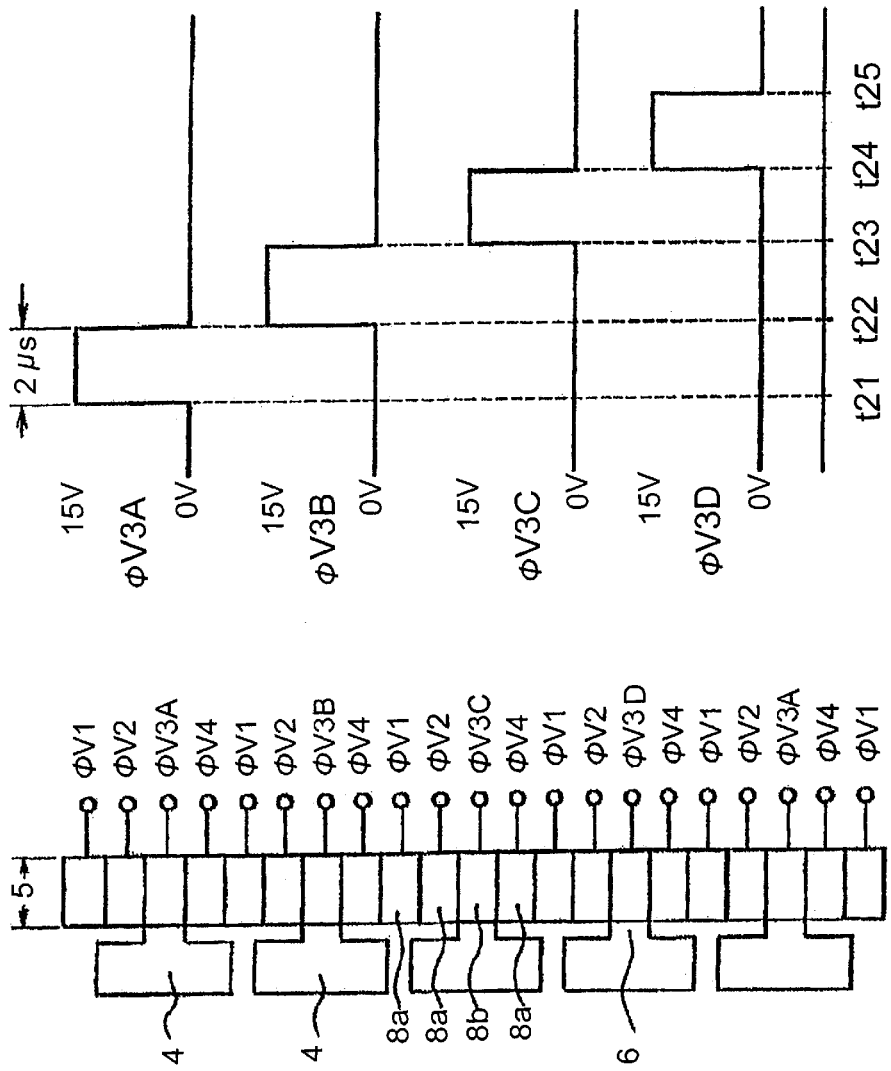
FIG. 14A is a plan view of photodiodes and a vertical CCD in an image sensor in which read-out pulses are applicable in every four pixel lines, in accordance with the second embodiment.
FIG. 14B illustrates waveforms of read-out pulses applied to pixels illustrated in FIG. 14A.

FIG. 14A illustrates photodiodes and a vertical CCD in an image sensor used for carrying out a method in accordance with the second embodiment, and FIG. 14B illustrates waveforms of read-out pulses applied to pixels in the image sensor. In the image sensor, different read-out pulses are applied to pixels in every four pixel lines. As illustrated in FIG. 14A, read-out pulses φV3A, φV3B, φV3C and φV3D are applied to vertical transfer electrodes 8b acting also as a read-out electrode.

With reference to FIG. 14B, the pulse φV3A is varied from a middle level (for instance, 0V) to a high level (for instance, 15V) at time t21 in a vertical blanking period. The pulse φV3A has a duration of about 2 μs. Hence, the pulse φV3A is varied from the high level to the middle level at time t22 which is later than time t21 by about 2 μs, because electric charges are all read out from the associated photodiode at time t22.

In synchronization with time 22 at which the pulse φV3A is reduced to the middle level, the pulse φV3B is raised from a middle level to a high level. Both a trailing edge of the pulse φV3A and a leading edge of the pulse φV3B are applied to the image sensing region. Since positive and negative pulse voltages are simultaneously applied to the image-sensing region, influences exerted by those voltages are cancelled with each other. This results in that a ground potential in the p-type well layer is not caused to fluctuate, and an increase in the reverse-transfer voltage can be suppressed.

Then, the pulse φV3B is varied from the high level to the middle level at time t23 which is later than time t22 by about 2 μs, because electric charges are all read out from the associated photodiode at time t23.

In synchronization with time 23 at which the pulse φV3B is reduced to the middle level, the pulse φV3C is raised from a middle level to a high level. Both a trailing edge of the pulse φV3B and a leading edge of the pulse φV3C are applied to the image sensing region. Since positive and negative pulse voltages are simultaneously applied to the image-sensing region, influences exerted by those voltages are cancelled with each other. This results in that a ground potential in the p-type well layer is not caused to fluctuate, and an increase in the reverse-transfer voltage can be suppressed.

Similarly, the pulse φV3C is varied from the high level to the middle level at time t24 which is later than time t23 by about 2 μs, because electric charges are all read out from the associated photodiode at time t24, In synchronization with time 24 at which the pulse φV3B is reduced to the middle level, the pulse φV3D is raised from a middle level to a high level. The pulse φV3D is varied from the high level to the middle level at time t25 which is later than time t24 by about 2 μs, because electric charges are all read out from the associated photodiode at time t25.

Thus, an increase in the reverse-transfer voltage, caused by application of a high positive voltage to pixels, can be suppressed, resulting in that a substrate voltage can be reduced. The reduced substrate voltage enhances accumulation capacity of a photodiode, and hence, enhances a saturated amount of electric charges for a photodiode. This results in that a dynamic range can be widened, and highly qualified images can be obtained.

In the second embodiment, the pulses φV3A, φV3B, φV3C and φV3D are applied to pixels in this order, but it should be noted that an order in which the pulses φV3A, φV3B, φV3C and φV3D are applied to pixels is not to be limited to this. The pulses φV3A, φV3B, φV3C and φV3D may be applied in any order.

In addition, the method in accordance with the present embodiment can be carried out in an image sensor where read-out pulses are applied pixels in every two pixel lines or in every five or greater pixel lines.

[Third Embodiment]

The above-mentioned first and second embodiments may be accompanied with a problem caused by a difference in time for accumulating electric charges in photodiodes.

Figure 15:
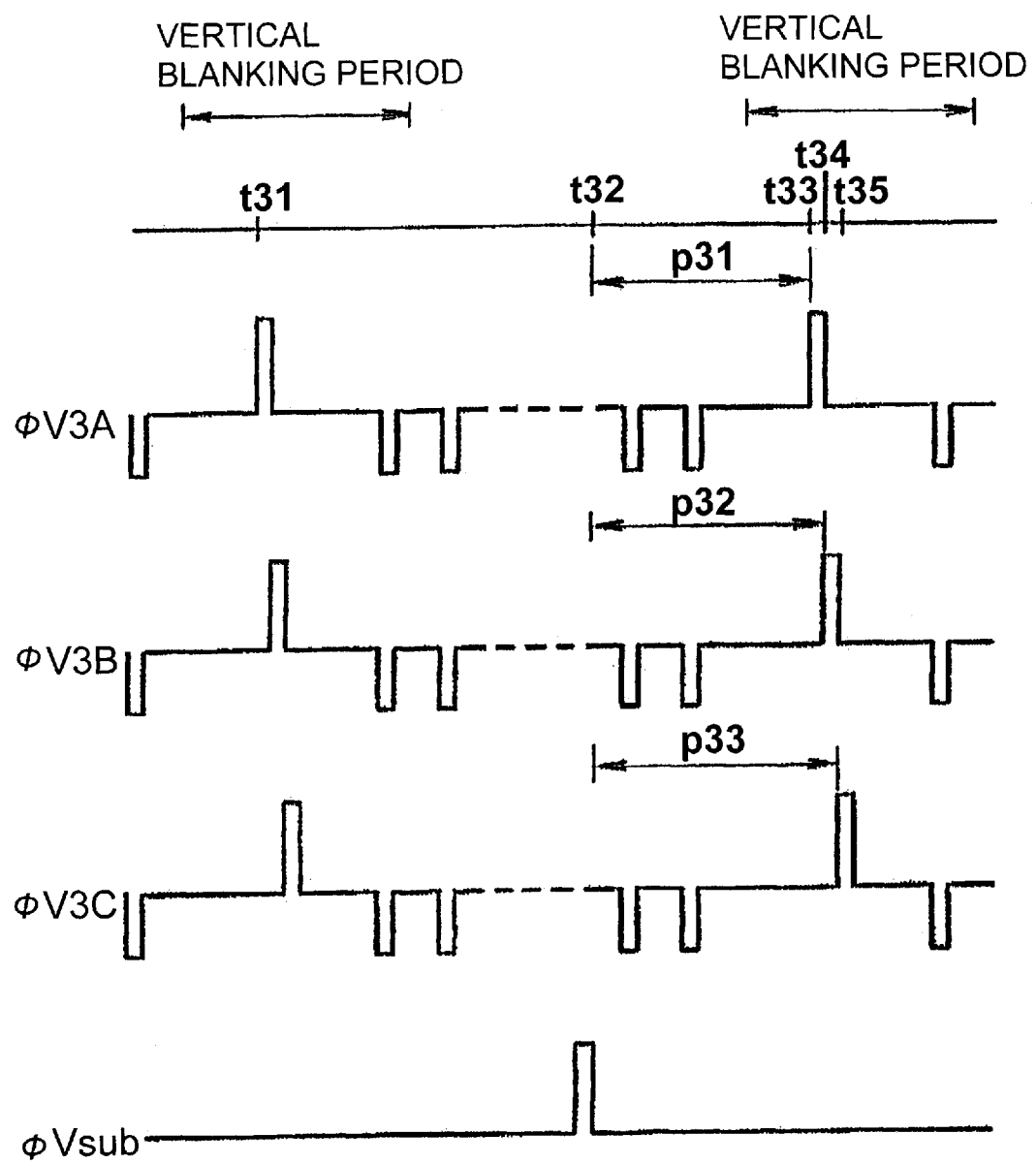
FIG. 15 illustrates waveforms showing a period of time in which electric charges are accumulated in photodiodes.

FIG. 15 illustrates signal waveforms showing a difference in a time for accumulating electric charges in photodiodes (hereinafter, "a time for accumulating electric charges in photodiodes" is referred to simply as "accumulation time").

In a solid-state image sensor, there may be carried out an operation in which electric charges being accumulated in photodiodes are swept into a substrate before electric charges having been accumulated in photodiodes are transferred to vertical CCDs to obtain desired sensitivity. This operation is called "a substrate shutter" or "an electron shutter".

In FIG. 15, if the operation "a substrate shutter" is not carried out, the accumulation time is defined as a time between a read-out pulse in a vertical blanking period and a read-out pulse in the next vertical blanking period. That is, the accumulation time is defined as a time between time t31 and time t33. The accumulation time is dependent on a method of driving an image sensor. For instance, the accumulation time is 1/10 second or 1/30 second.

The operation of a substrate shutter is carried out by applying a high positive voltage to a substrate at time 32, to thereby sweep electric charges accumulated in photodiodes, into a substrate before electric charges accumulated in photodiodes are read out into vertical CCDs. Thus, a time for actually accumulating electric charges in photodiodes is defined as a time between time t32 and a time at which the next read-out pulse is applied. Specifically, the accumulation time is defined as a period of time p31, p32 or p33.

In the first and second embodiments, the accumulation time is slightly different among pixel lines. This is shown in FIG. 15 as the fact that the accumulation times p31, p32 and p33 are all different from one another.

For instance, the accumulation time is usually expected to be in the range of about 1/10000 second to about 1/10 second. It is now assumed that the accumulation time is set equal to 1/10 second in order to take a picture in rather dark environment. In the above-mentioned fist and second embodiments, a difference in the accumulation time between pixel lines is equal to a period of time p31, that is, from time t32 to time t33, in a pixel line to which the pulse φV3A is applied, and a difference in the accumulation time between pixel lines is equal to a period of time p33, that is, from time t32 to time t35, in a pixel line to which the pulse φV3C is applied. Hence, a difference in the accumulation time is equal to about 4 µs at greatest. This difference makes merely 0.004% relative to the accumulation time of 1/10 second (100 ms), and hence, does not cause any problem.

On the other hand, if a picture is to be taken in bright environment, the accumulation time may be set equal to 1/10000 second (100 µs). A difference in the accumulation time between pixel lines remains the same, that is, is equal to about 4 µs. Hence, this difference makes 4% relative to the accumulation time of to 1/10000 second (100 µs).

The difference of 4% is a range which can be recognized in a screen. As a result, there is obtained only images including an output difference among pixel lines. Specifically, output images includes lateral stripes with the result of degradation of quality of images.

The above-mentioned example relates to an image sensor where read-out pulses are applied in every three pixel lines. A difference in the accumulation time will become greater in image sensors where read-out pulses are applied in every four or greater pixel lines, resulting in that more remarkable lateral stripes are included in images.

The third embodiment solves the above-mentioned problem.

Figures 16A, 16B:
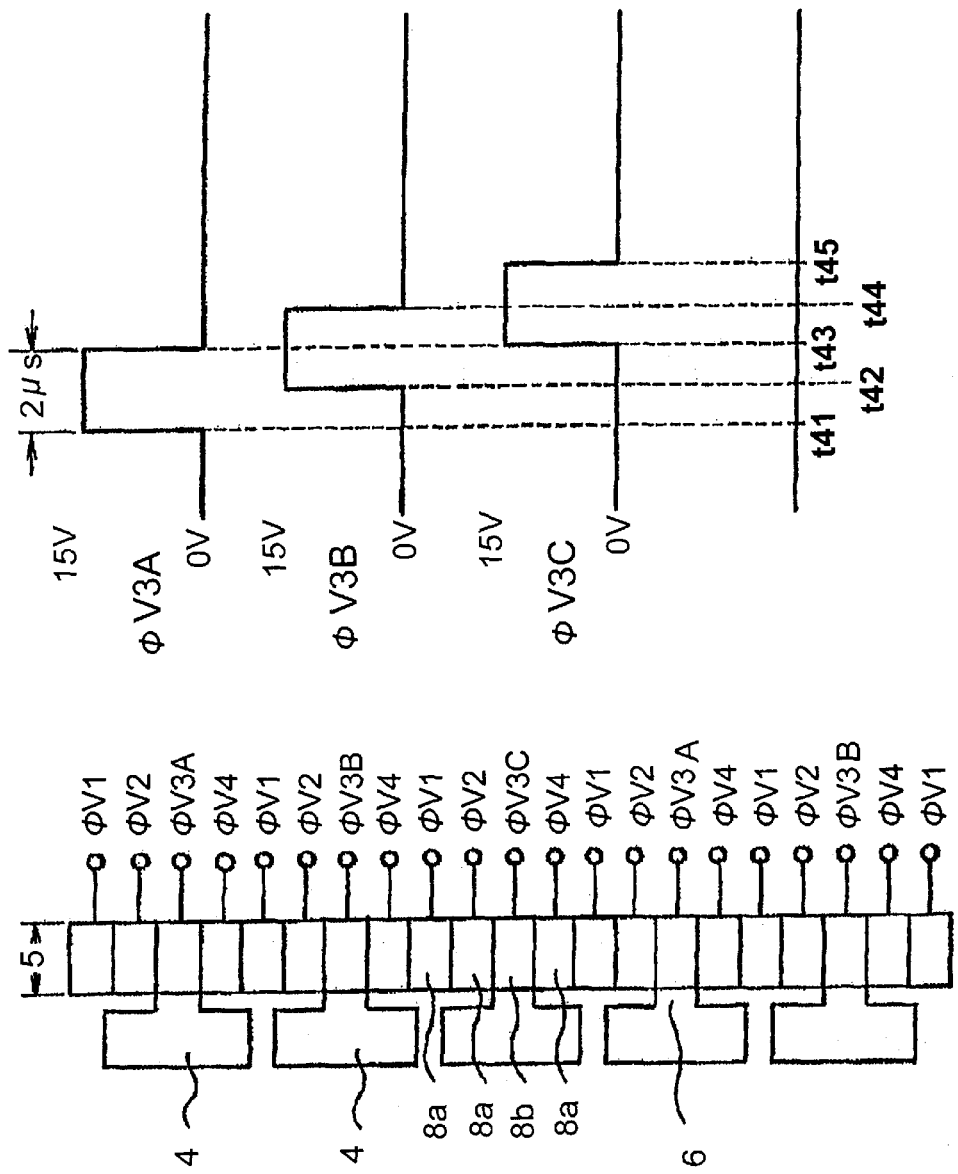
FIG. 16A is a plan view of photodiodes and a vertical CCD in an image sensor in which read-out pulses are applicable in every three pixel lines, in accordance with the third embodiment.
FIG. 16B illustrates waveforms of read-out pulses applied to pixels illustrated in FIG. 16A.

FIG. 16A illustrates photodiodes and a vertical CCD in an image sensor used for carrying out a method in accordance with the third embodiment, and FIG. 16B illustrates waveforms of read-out pulses applied to pixels in the image sensor. In the image sensor, different read-out pulses are applied to pixels in every three pixel lines. As illustrated in FIG. 16A, read-out pulses φV3A, φV3B and φV3C are applied to vertical transfer electrodes 8b acting also as a read-out electrode.

With reference to FIG. 16B, the pulse φV3A is varied from a middle level (for instance, 0V) to a high level (for instance, 15V) at time t41 in a vertical blanking period. The pulse φV3A has a duration of about 2 µs. Hence, the pulse φV3A is kept at a high level until time t43 which is later than time t41 by about 2 µs.

The pulse φV3B is varied from a middle level to a high level at time t42 between time t41 and time t43. The pulse φV3B has a duration of about 2 µs. Hence, the pulse φV3B is kept at a high level until time t44 which is later than time t42 by about 2 µs.

Then, the pulse φV3A is varied from the high level to the middle level at time t43, because electric charges are all read out from the associated photodiode at time t43.

In synchronization with time 43 at which the pulse φV3A is reduced to the middle level, the pulse φV3C is raised from a middle level to a high level. Both a trailing edge of the pulse φV3A and a leading edge of the pulse φV3C are applied to the image sensing region. Since positive and negative pulse voltages are simultaneously applied to the image-sensing region, influences exerted by those voltages are cancelled with each other. This results in that a ground potential in the p-type well layer is not caused to fluctuate, and an increase in the reverse-transfer voltage can be suppressed.

Then, the pulse φV3B is varied from the high level to the middle level at time t44 which is later than time t42 by about 2 µs, because electric charges are all read out from the associated photodiode at time t44. The pulse φV3C is kept at a high level until t45 which is later than time t43 by about 2 µs, and is varied from the high level to the middle level at time t45, because electric charges are all read out from the associated photodiode at time t45.

In accordance with the third embodiment, it is possible to reduce a difference in the accumulation time by half in comparison with the first embodiment. Specifically, if the accumulation time is set equal to 1/10000 second, a difference in the accumulation time in the first embodiment is 4%, whereas the same in the third embodiment is 2%, which is smaller than a target difference of 3% with the result that lateral stripes are hardly observed in images to thereby ensure no problem in practical use.

In the third embodiment, the pulses φV3A, φV3B and φV3C are applied to pixels in this order, but it should be noted that an order in which the pulses φV3A, φV3B and φV3C are applied to pixels is not to be limited to this. The pulses φV3A, φV3B and φV3C may be applied in any order.

[Fourth Embodiment]

FIG. 17A illustrates photodiodes and a vertical CCD in an image sensor used for carrying out a method in accordance with the fourth embodiment, and FIG. 17B illustrates waveforms of read-out pulses applied to pixels in the image sensor. In the image sensor, different read-out pulses are applied to pixels in every four pixel lines. As illustrated in FIG. 17A, read-out pulses φV3A, φV3B, φV3C and φV3D are applied to vertical transfer electrodes 8b.

With reference to FIG. 17B, the pulse φV3A is varied from a middle level (for instance, 0V) to a high level (for instance, 15V) at time t51 in a vertical blanking period. The pulse φV3A has a duration of about 2 µs. Hence, the pulse φV3A is kept at a high level until time t53 which is later than time t51 by about 2 µs.

The pulse φV3B is varied from a middle level to a high level at time t52 between time t51 and time t53. The pulse φV3B has a duration of about 2 µs. Hence, the pulse φV3B is kept at a high level until time t64 which is later than time t52 by about 2 µs.

Then, the pulse φV3A is varied from the high level to the middle level at time t53, because electric charges are all read out from the associated photodiode at time t53.

In synchronization with time t63 at which the pulse φV3A is reduced to the middle level, the pulse φV3C is raised from a middle level to a high level. Both a trailing edge of the pulse φV3A and a leading edge of the pulse φV3C are applied to the image sensing region. Since positive and negative pulse voltages are simultaneously applied to the image-sensing region, influences exerted by those voltages are cancelled with each other. This results in that a ground potential in the p-type well layer is not caused to fluctuate, and an increase in the reverse-transfer voltage can be suppressed.

Then, the pulse φV3B is varied from the high level to the middle level at time t54 which is later than time t52 by about 2 µs, because electric charges are all read out from the associated photodiode at time t54.

In synchronization with time t54 at which the pulse φV3B is reduced to the middle level, the pulse φV3D is raised from a middle level to a high level. Both a trailing edge of the pulse φV3B and a leading edge of the pulse φV3D are applied to the image sensing region. Since positive and negative pulse voltages are simultaneously applied to the image-sensing region, influences exerted by those voltages are cancelled with each other. This results in that a ground potential in the p-type well layer is not caused to fluctuate, and an increase in the reverse-transfer voltage can be suppressed.

The pulse φV3C is kept at a high level until t55 which is later than time t53 by about 2 μs, and is varied from the high level to the middle level at time t55, because electric charges are all read out from the associated photodiode at time t55. The pulse φV3D is kept at a high level until t56 which is later than time t54 by about 2 μs, and is varied from the high level to the middle level at time t56, because electric charges are all read out from the associated photodiode at time t56.

In accordance with the fourth embodiment, it is possible to reduce a difference in the accumulation time by half in comparison with the second embodiment. Specifically, if the accumulation time is set equal to ⅟₁₀₀₀₀ second, a difference in the accumulation time in the second embodiment is 6%, whereas the same in the fourth embodiment is 3%, which is smaller than a target difference of 3% with the result that lateral stripes are hardly observed in images to thereby ensure no problem in practical use.

In the fourth embodiment, the pulses φV3A, φV3B, φV3C and φV3D are applied to pixels in this order, but it should be noted that an order in which the pulses φV3A, φV3B, φV3C and φV3D are applied to pixels is not to be limited to this. The pulses φV3A, φV3B, φV3C and φV3D may be applied in any order.

In addition, the method in accordance with the present embodiment can be carried out in an image sensor where read-out pulses are applied pixels in every five or greater pixel lines.

[Fifth Embodiment]

The above-mentioned third and fourth embodiments make it possible to reduce a difference in the accumulation time among pixel lines in comparison with the first and second embodiments. However, a difference in the accumulation time does still exist, and a problem that a difference in the accumulation time becomes greater in every greater number of pixel lines, remains unsolved.

Thus, the inventor tried to minimize a difference in the accumulation time. However, if a difference in the accumulation time were made too small, the reverse-transfer voltage would be raised. To this end, the inventor conducted the experiments many times, and discovered that if a timing at which a pulse rose up was cancelled at least once with a timing at which a pulse was fell down, the reverse-transfer voltage could be lowered.

The fifth embodiment explained hereinbelow is based on the above-mentioned discovery.

Figures 18A, 18B:
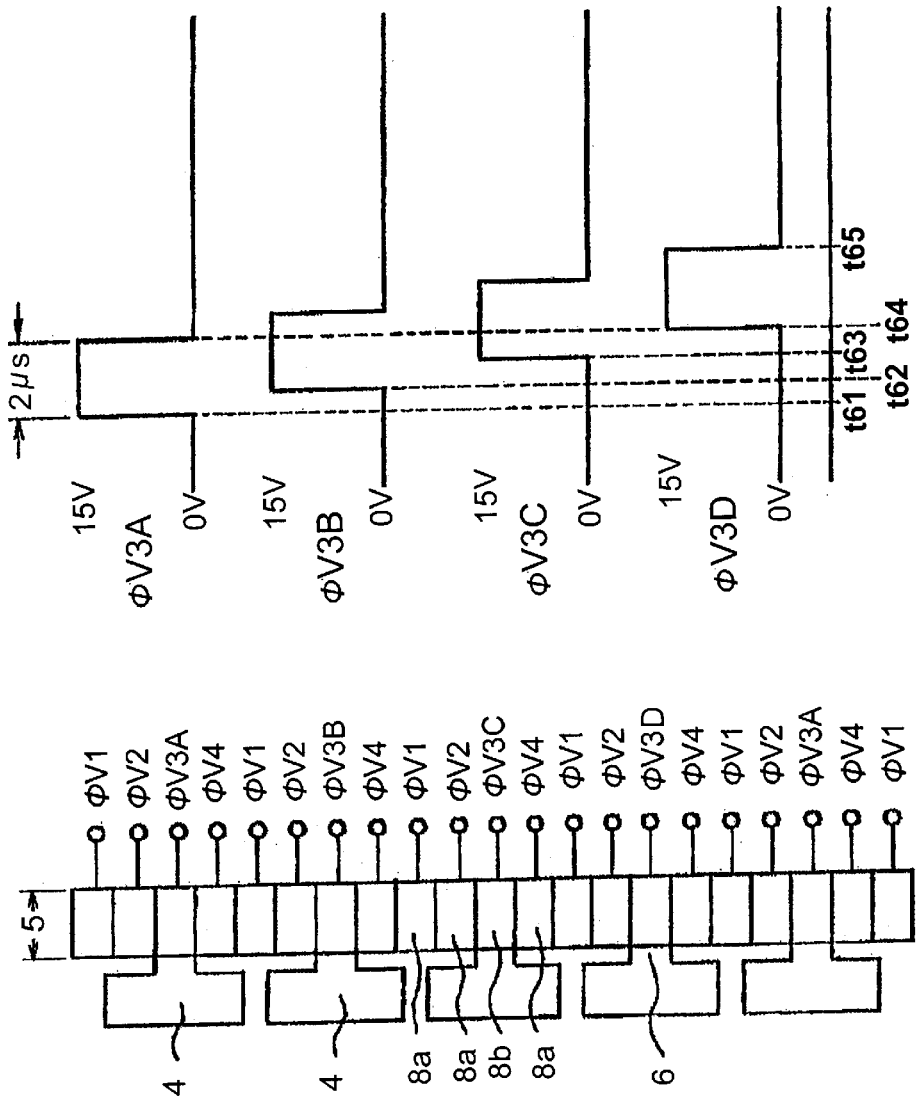
FIG. 18A is a plan view of photodiodes and a vertical CCD in an image sensor in which read-out pulses are applicable in every four pixel lines, in accordance with the fifth embodiment.
FIG. 18B illustrates waveforms of read-out pulses applied to pixels illustrated in FIG. 18A.

FIG. 18A illustrates photodiodes and a vertical CCD in an image sensor used for carrying out a method in accordance with the fifth embodiment, and FIG. 18B illustrates waveforms of read-out pulses applied to pixels in the image sensor. In the image sensor, different read-out pulses are applied to pixels in every four pixel lines. As illustrated in FIG. 18A, read-out pulses φV3A, φV3B, φV3C and φV3D are applied to vertical transfer electrodes 8b.

With reference to FIG. 18B, the pulse φV3A is varied from a middle level (for instance, 0V) to a high level (for instance, 15V) at time t61 in a vertical blanking period. The pulse φV3A has a duration of about 2 μs. Hence, the pulse φV3A is kept at a high level until time t63 which is later than time t61 by about 2 μs.

The pulse φV3B is varied from a middle level to a high level at time t62 between time t61 and time t64. The pulse φV3B has a duration of about 2 μs. Hence, the pulse φV3B is kept at a high level for about 2 μs from t62.

The pulse φV3C is varied from a middle level to a high level at time t63 between time t62 and time t64. The pulse φV3C has a duration of about 2 μs. Hence, the pulse φV3C is kept at a high level for about 2 μs from t63.

The pulse φV3A is varied from the high level to the middle level at time t64, because electric charges are all read out from the associated photodiode at time t64.

In synchronization with time t64 at which the pulse φV3A is reduced to the middle level, the pulse φV3D is raised from a middle level to a high level. Both a trailing edge of the pulse φV3A and a leading edge of the pulse φV3D are applied to the image sensing region. Since positive and negative pulse voltages are simultaneously applied to the image-sensing region, influences exerted by those voltages are cancelled with each other. This results in that a ground potential in the p-type well layer is not caused to fluctuate, and an increase in the reverse-transfer voltage can be suppressed.

Then, the pulses φV3B, φV3C and φV3D are varied from a high level to a middle level in this order. The pulses φV3A to φV3D are raised up at the same interval. For instance, an interval between times t61 and t62 is equal to an interval between times t62 and t68. In addition, the pulses φV3A to φV3D has the same duration.

In the fifth embodiment, the pulses φV3A, φV3B, φV3C and φV3D are applied to pixels in this order, but it should be noted that an order in which the pulses φV3A, φV3B, φV3C and φV3D are applied to pixels is not to be limited to this. The pulses φV3A, φV3B, φV3C and φV3D may be applied in any order.

In accordance with the fifth embodiment, it is possible to reduce a difference in the accumulation time to 2 μs at greatest. In addition, the same advantages as those of the fifth embodiment can be obtained in an image sensor in which pulses are applied to pixels in every five or greater pixel lines, if all leading edges of pulses are within a term between a leading edge of the first pulse and a trailing edge of the last pulse, and a trailing edge of the first pulse is synchronized with a leading edge of the last pulse.

In accordance with the fifth embodiment, a difference in the accumulation time is 2 μs at maximum, which ensures no lateral stripes in images, caused by much difference in the accumulation time among pixel lines.

In the above-mentioned embodiments, vertical transfer of electric charges are carried out in four-phase drive, and the vertical transfer electrodes are composed of three-layered polysilicon. However, it should be noted that vertical transfer of electric charges may be carried out in three, five or greater phase drive, and that the vertical transfer electrodes may be composed of four or greater layered polysilicon or other materials.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-188446 filed on Jul. 3, 1998 including specification, claims, drawings and summary is incorporated herein by reference in its entirety.

What is claimed is:

1. A method of driving a solid-state image sensor, comprising the steps of:

transferring signal charges from photoelectric transfer devices to vertical CCDs constituted of a plurality of pixels, when a pulse is applied to said pixel, said pulse being applied to said pixels in at least two pixel lines so that a pulse to be applied in a first pixel line and a pulse to be applied in a second pixel line are applied at different times;

transferring said signal charges from said vertical CCDs to a horizontal CCD; and outputting said signal charges from said horizontal CCD to an external circuit, wherein a time interval separating a rising edge of the pulse applied to the first pixel and a rising edge of the pulse applied to the second pixel is less than or equal to a time of the pulse applied to the first pixel.

2. A method of driving a solid-state image sensor, comprising the steps of:

transferring signal charges from photoelectric transfer devices to vertical CCDs constituted of a plurality of pixels, when a pulse is applied to said pixel, said pulse being applied to said pixels in at least two pixel lines so that a trailing edge of a first pulse to be applied in a first pixel line corresponds with a leading edge of a second pulse to be applied in a second pixel line;

transferring said signal charges from said vertical CCDs to a horizontal CCD; and outputting said signal charges from said horizontal CCD to an external circuit.

3. The method as set forth in claim 2, wherein at least two trailing edges of pulses are in synchronization with leading edges of other pulses, respectively.

4. A method of driving a solid-state image sensor, comprising the steps of:

transferring signal charges from photoelectric transfer devices to vertical CCDs constituted of a plurality of pixels, when a pulse is applied to said pixel, said pulse being applied to said pixels in at least two pixel lines so that a trailing edge of a pulse to be applied in a pixel line corresponds with a leading edge of a pulse to be applied in an adjacent pixel line;

transferring said signal charges from said vertical CCDs to a horizontal CCD; and outputting said signal charges from said horizontal CCD to an external circuit.

5. A method of driving a solid-state image sensor, comprising the steps of:

transferring signal charges from photoelectric transfer devices to vertical CCDs constituted of a plurality of pixels, when a pulse is applied to said pixel, said pulse being applied to said pixels in at least two pixel lines so that a trailing edge of a pulse applied to the first pixel line corresponds with a leading edge of a pulse applied to the last pixel line;

transferring said signal charges from said vertical CCDs to a horizontal CCD; and outputting said signal charges from said horizontal CCD to an external circuit.

6. The method as set forth in claim 5, wherein said pulses are applied to pixel lines at the same interval.

7. The method as set forth in claim 5, wherein said pulses are applied to pixel lines at the same period of time.

8. A method of reading out signal charges, the method comprising the step of: reading out signal charges from photoelectric transfer devices to vertical CCDs constituted of a plurality of pixels, when a pulse is applied to said pixel, said pulse being applied to said pixels in at least two pixel lines so that pulses are applied to adjacent pixel lines at different timings, wherein a time interval separating a rising edge of a first pulse and a rising edge of a second pulse is less than or equal to the time of the first pulse.

9. A method of reading out signal charges, the method comprising the step of: reading out signal charges from photoelectric transfer devices to vertical CCDs constituted of a plurality of pixels, when a pulse is applied to said pixel, said pulse being applied to said pixels in at least two pixel lines so that a trailing edge of a first pulse to be applied in a first pixel line corresponds with a leading edge of a second pulse to be applied in a second pixel line.

10. The method as set forth in claim 9, wherein at least two trailing edges of pulses are in synchronization with leading edges of other pulses, respectively.

11. The method as set forth in claim 9, wherein pulses are applied to pixel lines at the same interval.

12. The method as set forth in claim 9, wherein pulses are applied to pixel lines at the same period of time.

13. A method of driving a solid-state image sensor, comprising the steps of:

transferring signal charges from photoelectric transfer devices to vertical CCDs constituted of a plurality of pixels, when a pulse is applied to said pixel, said pulse being applied to said pixels in every two or more pixel lines so that a trailing edge of a first pulse to be applied in a first pixel line is in synchronization with a leading edge of a second pulse to be applied in a second pixel line;

transferring said signal charges from said vertical CCDs to a horizontal CCD; and outputting said signal charges from horizontal CCD to an external circuit, wherein at least two trailing edges of pulses are in synchronization with leading edges of other pulses, respectively.

14. A method of reading out signal charges, the method comprising the step of: reading out signal charges from photoelectric transfer devices to vertical CCDs constituted of a plurality of pixels, when a pulse is applied to said pixel, said pulse being applied to said pixels in every two or more pixel lines so that a trailing edge of a first pulse to be applied in a first pixel line are in synchronization with a leading edge of a second pulse to be applied in a second pixel line, wherein at least two trailing edges of pulses are in synchronization with leading edges of other pulses, respectively.

15. The method as set forth in claim 14, wherein pulses are applied to pixel lines at the same interval.

16. The method as set forth in claim 14, wherein pulses are applied to pixel lines at the same period of time.

* * * * *